AUTOMATIC CONTROL CIRCUIT FOR TELEVISION RECEIVERS
Filed Aug. 6, 1962
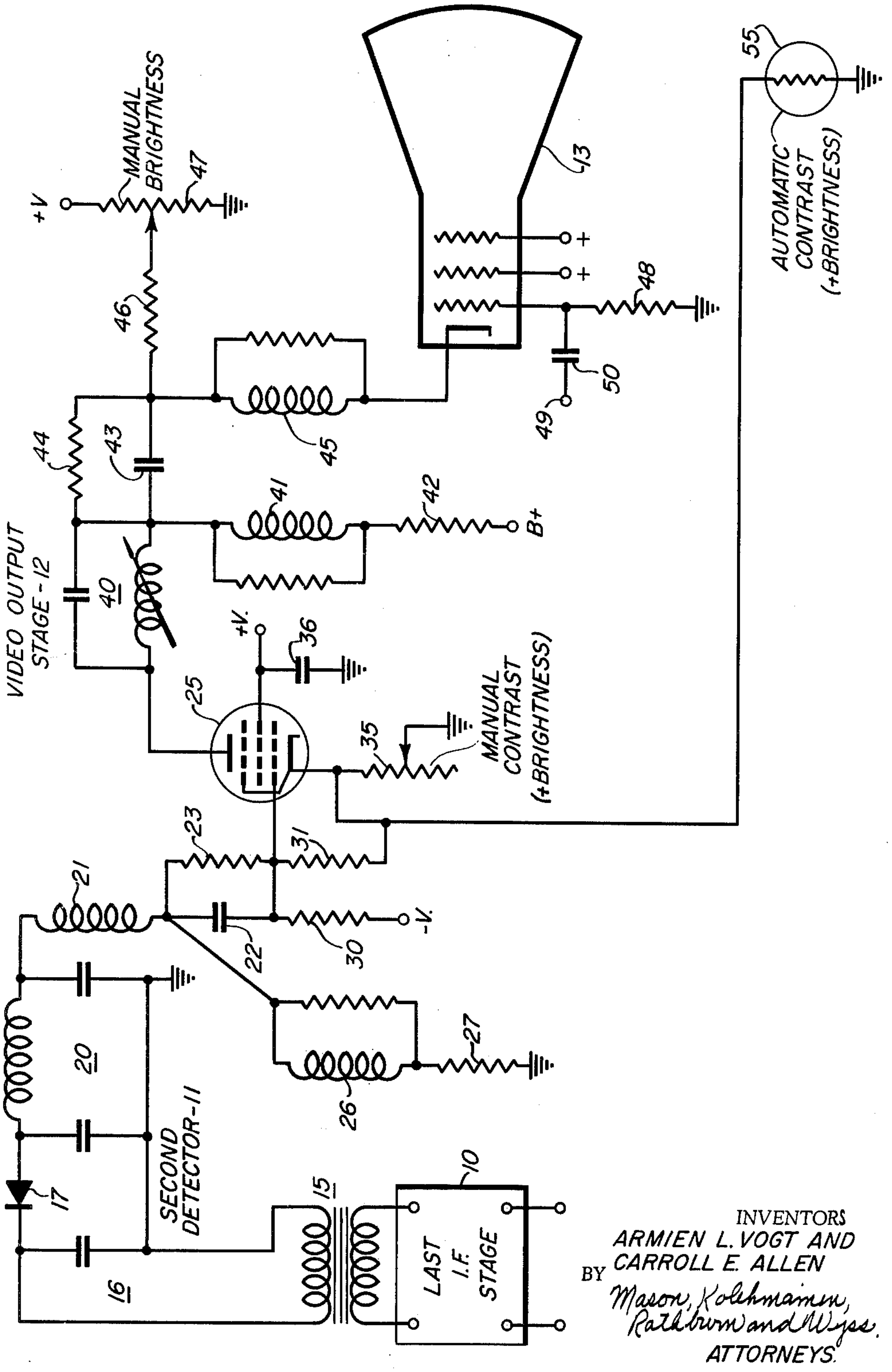
INVENTORS
ARMIEN L. VOGT AND
CARROLL E. ALLEN
BY Mason, Kolehmainen, Rathburn and Wyss.
ATTORNEYS.

United States Patent Office 3,214,517
Patented Oct. 26, 1965

3,214,517
AUTOMATIC CONTROL CIRCUIT FOR TELEVISION RECEIVERS

Armien L. Vogt, Elmhurst, and Carroll E. Allen, Des Plaines, Ill., assignors to Wells-Gardner Electronics Corporation, Chicago, Ill., a corporation of Illinois Filed Aug. 6, 1962, Ser. No. 215,061
7 Claims. (Cl. 178—7.5)

The present invention relates to an automatic control circuit for a television receiver, and, more particularly, to a control circuit for automatically controlling the contrast and brightness of the reproduced television picture in accordance with the level of light in the room in which the picture is being viewed.

Certain arrangements heretofore proposed have provided a control circuit arrangement for automatically varying the brightness and/or contrast of the reproduced television picture in accordance with the ambient light level in the area of the television picture. In these arrangements, a photo cell is positioned close to the face of the picture tube so that the same level of ambient light strikes both the photo cell and the picture tube. The change in resistance of the photo cell with changes in ambient light is employed to vary the video contrast level inversely with changes in the level of light striking the face of the picture tube.

While these arrangements have, in general, been satisfactory for their intended purpose, a situation sometimes arises in which these prior art circuit arrangements are completely inadequate and, in fact, the automatic brightness and control feature of these prior art arrangements may actually produce a more undesirable picture than if such circuit were not provided in the receiver. Thus, in fringe areas at the edge of the transmitter service field, where the received television signals are quite weak, it is many times desirable to operate the receiver at full gain, that is, with maximum contrast for the reproduced television picture. However, in those receivers provided with prior art automatic contrast control circuits, if the receiver happens to be positioned in a relatively dark room in which a low level of ambient light strikes the television picture tube, the automatic contrast control circuit functions to reduce the contrast to a low value, due to the low ambient light level, whereas the weak signal requires maximum contrast to provide a suitable picture. Accordingly, under these conditions the automatic contrast control circuit of the prior art arrangement is unsatisfactory and results in a washed out picture of poor contrast and definition. Similarly, in situations where the television transmitter is transmitting with a low percentage modulation and the television receiver is positioned in a room with very little light, the automatic contrast control circuits of the prior art arrangements function to reduce the contrast and brightness of the picture, although maximum contrast is called for to provide a suitable picture, due to the low percentage modulation of the received signal.

In addition to the above, certain prior art arrangements for providing automatic contrast and brightness control have incorporated the light sensitive element in the plate circuit of the video tube and in these arrangements compensation for the leads connecting the light sensitive element to the video plate circuit is required. Since the light sensitive element is normally positioned adjacent the face of the television picture tube, the lead lengths will change with different configurations of cabinets, thus requiring different compensations for different receivers. In an effort to keep the lead lengths from the light sensitive device to the video plate circuit at a minimum, some prior art arrangements have even resorted to the expedient of mounting the light sensitive device adjacent the video output tube circuit with short leads and providing a lucite light pipe from the front of the television cabinet back to the light sensitive device to conduct light proportional to the ambient back to the photo cell.

It is, therefore, a primary object of the present invention to provide a new and improved automatic contrast control circuit in which one or more of the above mentioned disadvantages of the prior art arrangements are avoided.

It is another object of the present invention to provide a new and improved automatic contrast control circuit wherein adjustment of the contrast of the reproduced picture is automatically provided in accordance with the level of light in the vicinity of the television receiver while providing means for overriding this automatic adjustment so that any desired contrast level may be set.

It is a further object of the present invention to provide a new and improved automatic control circuit for a television receiver wherein the contrast and brightness of the reproduced television picture are automatically adjusted in accordance with the ambient light level in the vicinity of the receiver while providing means for manually overriding such automatic control so that the contrast adjustment may be set to any desired level.

It is still another object of the present invention to provide a new and improved automatic contrast control circuit for a television receiver which requires only the addition of a photosensitive element to provide such automatic control while, at the same time, providing means for overriding this automatic control operation in the event that a different contrast level is required from that established by the automatic control circuit.

It is a further object of the present invention to provide a new and improved automatic contrast and brightness control circuit for a television receiver which is extremely simple and economical and is adapted for mass production.

It is a still further object of the present invention to provide a new and improved automatic contrast control circuit for a television receiver wherein the photosensitive element may be placed at any desired location to detect ambient light level without interfering with the operation of other circuits of the receiver.

The invention, both as to its organization and method of operation, together with further objects and advantages thereof, will best be understood by reference to the following specification taken in connection with the accompanying drawing in which the single figure of the drawing is a schematic diagram of a portion of a television receiver embodying the features of the present invention.

Referring now to the single figure of the drawing, there is shown therein a portion of a television receiver embodying the features of the present invention. More particularly, the last IF stage 10 of the television receiver is shown in the drawing, it being understood that suitable circuits are provided ahead of the stage 10 for selectively receiving a desired television signal, hetrodyning the received signal with a local oscillator signal and providing suitable amplification for the resulting intermediate frequency signal so that the correct level of intermediate frequency signal is applied to the input of the IF stage 10. The output of the stage 10 is applied to a second detector indicated generally at 11 wherein the intermediate frequency signal is detected to provide the picture and sound components of the received television signal, the output of the second detector 11 being applied to a video output stage indicated generally at 12. The video signal components are amplified in the output stage 12 and are supplied to a television picture tube indicated generally at 13.

While the component units 10, 11, 12 and 13 of the receiver may be entirely conventional in nature, a brief description of the circuitry employed therein and the operation thereof may be helpful to an understanding of the features of the present invention. Thus, the output of the IF stage 10 is supplied to a coupling transformer 15, the tuned secondary circuit 16 of which is supplied to a crystal second detector 17 so that the video modulation components of the intermediate frequency signal are detected. A filter circuit indicated generally at 20 is provided in the output of the crystal detector 17 to remove the undesired intermediate frequency carrier components, the output of the filter 10 being supplied through a choke 21 and the parallel combination of the capacitor 22 and resistor 23 to the control grid of the video amplifier tube 25. The choke 21, together with a compensating coil 26 which is connected from the righthand end of the choke 21 to ground through the crystal load impedance 27, functions to remove harmonics of the undesired intermediate frequency signal. A negative bias potential derived from a suitable point in the receiver is supplied to the control grid of the tube 25 through a resistor 30, the correct value of this supply potential being provided by means of a resistor 31 which is connected between the control grid and cathode of the tube 25 so that the resistors 30 and 31 act as a voltage divider. A potentiometer 35 is connected between the cathode of the video output tube 25 and ground, this potentiometer being unbypassed so that adjustment thereof varies the video gain through the tube 25 and hence the contrast of the reproduced picture. The screen grid of the video tube 25 is connected to a suitable positive voltage and a capacitor 36 is connected between the screen grid and ground to provide decoupling for undesired A.C. signal components which may be present in the unidirectional supply.

The plate of the video output tube 25 is connected through a tuned circuit indicated generally at 40 which is tuned to 4.5 megacycles, i.e., the frequency separation between picture and sound carriers of the received television signal, and through a compensating coil 41 and plate load resistor 42 to a suitable B+ supply. The junction of the elements 40 and 41 is connected through a parallel combination of a coupling capacitor 43 and resistor 44 and a series compensating coil 45 to the cathode of the picture tube 13. Also, the junction of the elements 43, 44 and 45 is connected through a resistor 46 to the arm of a potentiometer 47 which is connected between a positive voltage point and ground, adjustment of the potentiometer 47 providing manual control of brightness, i.e., the cathode-control grid bias of the picture tube 13, as will be readily understood by those skilled in the art. The control grid of the picture tube 13 may be connected to ground through a resistor 48 and if desired a suitable field blanking signal in the form of a negative pulse type signal may be applied to the indicated terminal 49 so as to be coupled to this control grid through the capacitor 50.

Referring now more particularly to the features of the present invention, in accordance with this invention automatic control of the contrast and brightness of the reproduced television picture is provided by means of a light sensitive element 55 which is connected between the cathode of the tube 25 and ground. The light sensitive element 55 may comprise any suitable light sensitive device such as a photo cell or a solid state photoconductive transducer in which the internal impedance thereof varies inversely with the amount of light striking the device. Preferably, the light sensitive device 55 is placed so that light striking the picture tube 13 also strikes the light sensitive device 55. However, it will be understood that the device 55 may be placed at any other suitable location in the television cabinet so long as it responds to the ambient light level in the place where the receiver is located.

Considering now the operation of the system described heretofore, the manual contrast potentiometer 35 is provided for manual adjustment of both the contrast and brightness of the reproduced television picture and affects both the video gain through the tube 25, and hence the contrast of the reproduced picture, and the D.C. plate voltage of the tube 25. Since the tube 25 is directly coupled to the cathode of the picture tube 13 through the inductive portion of the tuned circuit 40, the resistor 44 and the compensating coil 45, variation of the D.C. plate voltage of the video output tube 25 causes a corresponding variation of the cathode-grid bias of the picture tube 13 so as to produce a variation in the brightness or background level of the reproduced picture. In this connection it will be understood that the resistors 44 and 46 and the manual brightness potentiometer 47 act as a voltage divider with regard to the D.C. plate voltage on the video output tube 25 so that only a portion of this plate voltage is applied to the cathode of the picture tube in accordance with the bias requirements of the picture tube. Accordingly, if the resistance of the manual contrast potentiometer 35 is increased a larger degenerative resistance is provided in the cathode circuit of the video tube 25 with the result that the gain of this tube is reduced and the contrast of the reproduced picture on the face of the picture tube 13 is likewise decreased. At the same time, the plate voltage of the video tube 25 will increase thereby decreasing the beam current of the picture tube 13 with the result that the brightness of the reproduced picture is also decreased. On the other hand, if the resistance of the potentiometer 35 is decreased, the gain of the video tube 25 is increased so the picture contrast becomes greater and, at the same time, the bias between the cathode and control grid of the picture tube 13 is decreased so that brightness of the picture is increased as well as the picture contrast. In this connection it will be noted that the crystal detector 17 is directly coupled to the control grid of the video tube 25 and the plate circuit of the video tube 25 is directly connected to the cathode of the picture tube 13. Accordingly, D.C. restoration of the detected video signal is provided in this circuit arrangement without employing diode restorers or other D.C. restoration devices.

Considering now the operation of the light sensitive device 55, it will be noted that this device is also connected in the cathode circuit of the video tube 25 so that the total cathode resistance for the tube 25 is the parallel combination of the light sensitive device 55 and the potentiometer 35. With a video output tube 25 of the commercial type 6BQ5 having a plate supply potential of 285 volts through a 5,000 ohm plate load resistor and a screen supply potential of 135 volts, the potentiometer 35 may have a maximum resistance value of 750-ohms and the light sensitive device 55 may comprise a photo cell the resistance of this varies from approximately 50 ohms at 100 foot lamberts of light to 1500 ohms at a light intensity of one foot lambert. With this arrangement, at high ambient light levels when the resistance of the light sensitive device is low the total cathode resistance in the cathode circuit of the video tube 25 will be low so that this tube will provide high gain and the reproduced television picture will have high contrast and brightness. On the other hand, at low ambient light levels the total cathode resistance of the tube 25 will be high, provided the manual contrast potentiometer 35 is not set to a low resistance value, so that the reproduced television picture will have low contrast and brightness.

In accordance with an important feature of the invention, the automatic operation of the light sensitive device 55 to provide automatic control of the contrast and brightness of the reproduced picture may be nullified or overridden by proper adjustment of the manual contrast potentiometer 35. Such cancellation or nulification of the automatic functioning of the device 55 becomes important in situations wherein the receiver is positioned in a relatively dark room and the television signal being received is either of weak signal strength or of low percentage modulation. Under these conditions, the resistance of the light sensitive device 55 remains high due to the low level of light at the location of the television receiver. However, high resistance of the light sensitive device normally provides low picture contrast so that insufficient contrast of the reproduced picture is experienced with a relatively weak received signal or a low percentage modulation of the video carrier.

In accordance with the present invention, under the above conflicting conditions the manual contrast potentiometer 35 may be adjusted to a relatively low value so that the total cathode resistance of the video tube 25 is low even though the resistance of the light sensitive device 55 is high. Accordingly, when the potentiometer 35 is adjusted to a relatively low value, maximum contrast of the reproduced picture may be obtained irrespective of the level of light striking the light sensitive device 55. If these conflicting conditions are removed, as when a relatively strong television station is received, it is only necessary to readjust the potentiometer 35 to its normal value and the light sensitive device will again function to provide automatic control of the contrast and brightness of the picture. Furthermore, this adjustment to nullify or restore the automatic operation of the device 55 is accomplished by means of the same control which the viewer normally uses to adjust contrast manually so that no special adjustment techniques or procedures need to be explained.

It will be noted that in the circuit arrangement of the present invention the only additional component required to provide automatic contrast and brightness control is the light sensitive device 55. Also, in accordance with the present invention the light sensitive device 55 is included in the cathode circuit of the video tube 25 which has a low impedance to ground due to the well known cathode follower action of an unbypassed cathode resistance. Accordingly, the length of the lead or leads employed to connect the light sensitive device 55 to the tube 25 is not critical since the low impedance of this cathode circuit prevents any stray circuit capacities or lead capacities from adversely affecting the frequency response of the video output tube 25. Accordingly, the light sensitive device 55 may be placed at any convenient location in the television cabinet without interfering with the video frequency response of the output tube 25 and without requiring any form of peaking or compensation in connection with the video output circuit. In this connection it will be understood that the frequency response of the output tube 25 will suffer severely if circuit capacitances are high, for example, in the plate circuit of the tube 25, due to the wide band frequency requirements of the video portion of the television receiver.

In the event that the plate circuit of the video tube 25 is not direct coupled to the input of the picture tube 13, the light sensitive device 55 can still function as an automatic contrast control and the potentiometer 35 will provide a manual override of this automatic control as described in detail heretofore. Thus, if the resistor 44 in the drawing is eliminated the D.C. coupling between the plate circuit of the video tube 25 and the cathode of the picture tube 13 is eliminated and only A.C. coupling is provided through the capacitor 43 from the plate circuit of the tube 25 to the cathode of the picture tube 13. When the resistor 44 is eliminated, variations in the D.C. plate voltage on the tube 25 are not impressed upon the cathode of the picture tube since the capacitor 43 blocks these voltage changes. However, the light sensitive device 55 still functions as an automatic contrast control to vary the gain of the video signal through the tube 25 in accordance with the level of ambient light. In this connection it will be understood that if the resistor 44 is eliminated suitable compensation of the video circuit for adequate frequency response and adjustment of the D.C. potential for the cathode and control grid of the picture tube 13 should be made, as will be readily understood by those skilled in the art.

While several embodiments of the invention have been shown, it will be understood, of course, that the invention is not limited thereto since many modifications may be made and it is therefore contemplated by the appended claims to cover any such modifications as fall within the true spirit and scope of the invention.

We claim:

1. In a television receiver the combination of a video output tube, having an input electrode, a cathode and an output electrode, a video detector circuit, means connecting said video detector circuit to said input electrode, a television display device having an input terminal, means directly coupling said output electrode of said output tube to said input terminal of said display device, a first variable resistance connected in the cathode circuit of said video tube, variation of said first resistance causing a variation in both the contrast and brightness of the picture produced on the display device, and a light sensitive element connected substantially in parallel with said first resistance element, the impedance of said light sensitive element being adapted to change in response to variations in the intensity of light falling thereon, whereby the contrast and brightness of the picture produced on said display device are automatically varied in accordance with the intensity of light falling on said light sensitive element, said first resistance element being adjustable to override variations in contrast and brightness of the picture produced by said light sensitive element so that maximum contrast may be obtained at any light level.

2. In a television receiver the combination of a video output tube, having an input electrode, a cathode and an output electrode, a video detector circuit, means connecting said video detector circuit to said input electrode, a television display device having an input terminal, means directly coupling said output electrode of said output tube to said input terminal of said display device, a first variable resistance connected between the cathode of said video tube and a point of fixed potential, variation of said first resistance causing a variation in both the contrast and brightness of the picture produced on the display device, and a light sensitive element connected between said cathode and a point of fixed potential, the resistance of said light sensitive element being adapted to change in response to variations in the intensity of light falling thereon, whereby the contrast and brightness of the picture produced on said display device are automatically varied in accordance with the intensity of light falling on said light sensitive element, said first resistance element being adjustable to override variations in contrast and brightness of the picture produced by said light sensitive element so that maximum contrast may be obtained independently of the intensity of light striking said element.

3. In a television receiver the combination of a video output tube, having an input electrode, a cathode and an output electrode, a video detector circuit, means connecting said video detector circuit to said input electrode, a television display device having an input terminal, means directly coupling said ontput electrode of said output tube to said input terminal of said display device, a first variable resistance connected between the cathode of said video tube and a point of fixed potential, variation of said first resistance causing a variation in both the contrast and brightness of the picture produced on the display device, and a photosensitive resistance element connected between said cathode and a point of fixed potential, the resistance of said photosensitive resistance element varying inversely with respect to the intensity of light falling thereon, whereby the contrast and brightness of the picture produced on said display device are automatically varied in accordance with the intensity of light falling on said photosensitive resistance element, said first resistance element being adjustable to shunt out variations in contrast and brightness of the picture produced by said photosensitive resistance element so that maximum contrast may be obtained at any light level.

4. In a television receiver the combination of a video output tube, having an input electrode, a cathode and an output electrode, a video detector circuit, a direct current coupling circuit interconnecting said video detector circuit and said output electrode, a television display device having an input terminal, means directly coupling said output electrode of said output tube to said input terminal of said display device, a first variable resistance connected between the cathode of said video tube and a point of fixed potential, variation of said first resistance causing a variation in both the contrast and brightness of the picture produced on the display device, and a light sensitive element connected substantially in parallel with said first resistance element, the impedance of said light sensitive element being adapted to change in response to variations in the intensity of light falling thereon, whereby the contrast and brightness of the picture produced on said display device are automatically varied in accordance with the intensity of light falling on said light sensitive element, said first resistance element being adjustable to override variations in contrast and brightness of the picture produced by said photosensitive resistance element so that maximum contrast may be obtained at any light level.

5. In a television receiver the combination of a video output tube, having an input electrode, a cathode and an output electrode, a video detector circuit, means directly coupling said video detector circuit to said input electrode, a television display device having first and second input terminals, means directly coupling said output electrode of said output tube to one of said input terminals of said display device, a manual contrast control element connected between the cathode of said video tube and a point of fixed potential, variation of said manual contrast control element causing a variation in both the contrast and brightness of the picture produced on the display device, a manual brightness control element, means including said manual brightness control element for varying the bias voltage between said first and second input terminals, thereby to cause a variation in the background level of the picture produced on the display device, and a light sensitive element connected between said cathode and a point of fixed potential, the resistance of said light sensitive element varying inversely with the intensity of light falling thereon, whereby the contrast and brightness of the picture produced on said display device are automatically varied in accordance with the intensity of light falling on said light sensitive element, said manual contrast control element being adjustable to override variations in contrast and brightness of the picture produced by said light sensitive element so that maximum contrast may be obtained at any ambient light level.

6. In a television receiver the combination of a video output tube, having an input electrode, a cathode and an output electrode, a video detector circuit, means connecting said video detector circuit to said input electrode, a television display device having an input terminal, means connecting said output electrode of said output tube to said input terminal of said display device, a manual contrast control element connected between the cathode of said video tube and a point of fixed potential, variation of said manual contrast control element causing a variation in the contrast of the picture produced on the display device, and a light sensitive element connected between said cathode and a point of fixed potential, the impedance of said light sensitive element varying in accordance with the intensity of light falling thereon, whereby the contrast of the picture produced on said display device is automatically varied in accordance with the intensity of light falling on said light sensitive element, said manual contrast control element being adjustable to override variations in contrast of the picture produced by said light sensitive element so that maximum contrast may be obtained at a low level of ambient light.

7. In a television receiver the combination of a video output tube, having an input electrode, a cathode and an output electrode, a video detector circuit, means connecting said video detector circuit to said input electrode, a television display device having an input terminal, means connecting said output electrode of said output tube to said input terminal of said display device, a manual contrast control element connected between the cathode of said video tube and a point of fixed potential, variation of said manual contrast control element causing a variation in the contrast of the picture produced on the display device, and a photo cell connected between said cathode and a point of fixed potential, the resistance of said photo cell varying inversely with the intensity of light falling thereon, whereby the contrast of the picture produced on said display device is automatically varied in accordance with the intensity of light falling on said photo cell, said manual contrast control element being adjustable to override variations in contrast of the picture produced by said photo cell so that maximum contrast may be obtained at a low level of ambient light.

References Cited by the Examiner

UNITED STATES PATENTS

| | | | |
|---|---|---|---|
| 2,970,188 | 1/61 | Kroger | 178—7.3 |
| 3,025,345 | 3/62 | Suhrmann | 178—7.5 |

DAVID G. REDINBAUGH, *Primary Examiner.*